May 18, 1965 A. ALFORD 3,184,684
PULSE STRETCHER UTILIZING DELAY FURNISHING POLARITY INVERTING MEANS AND MEANS FOR COMBINING INPUT PULSE WITH SAME DELAYED AND INVERTED
Filed April 25, 1962
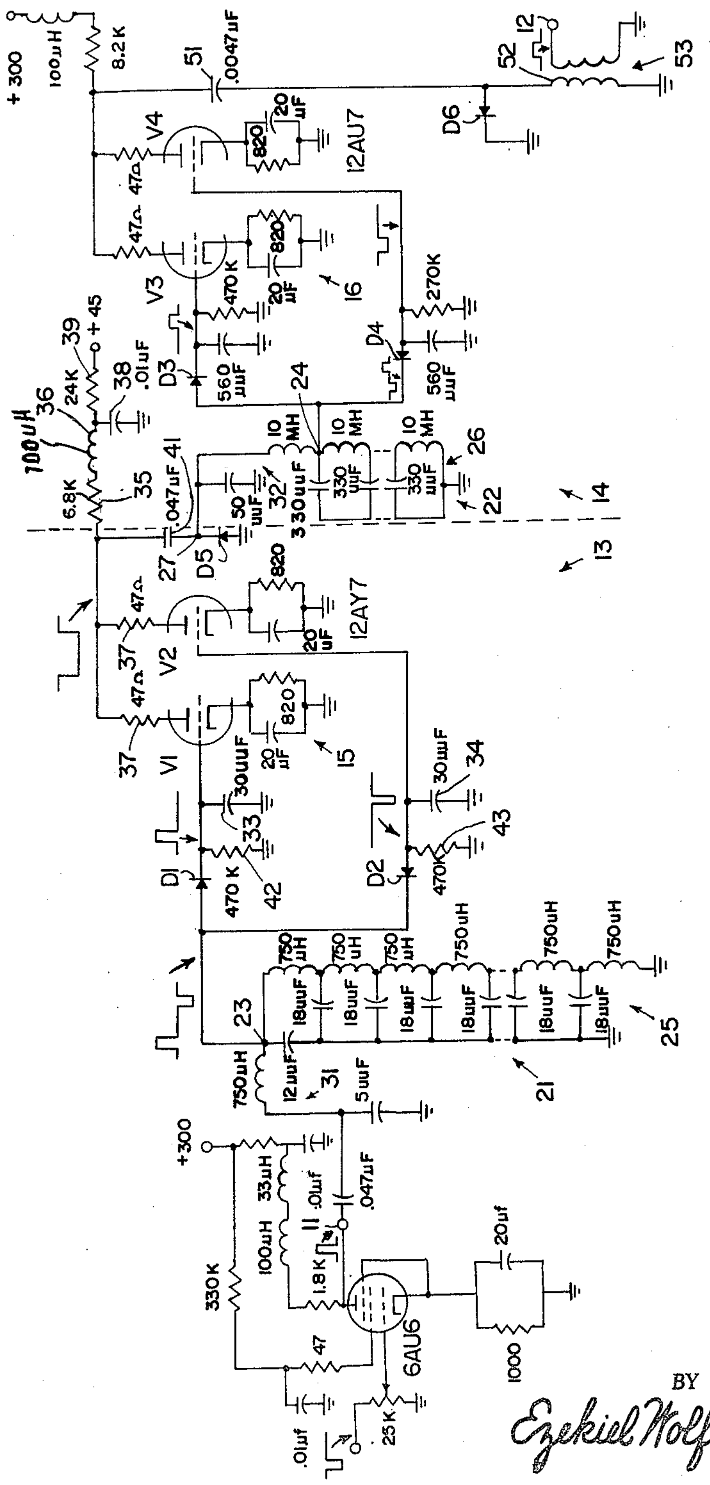
INVENTOR.
ANDREW ALFORD
BY Ezekiel Wolf, Wolf & Greenfield.
ATTORNEYS United States Patent Office 3,184,684
Patented May 18, 1965

3,184,684
PULSE STRETCHER UTILIZING DELAY FURNISHING POLARITY INVERTING MEANS AND MEANS FOR COMBINING INPUT PULSE WITH SAME DELAYED AND INVERTED

Andrew Alford, Winchester, Mass.
(299 Atlantic Ave., Boston, Mass.)
Filed Apr. 25, 1962, Ser. No. 190,123
10 Claims. (Cl. 328—58)

The present invention relates in general to pulse stretching and more particularly concerns a novel pulse stretcher for providing an output pulse of predetermined duration in response to an input pulse of shorter duration while maintaining the output pulse amplitude proportional to that of the input pulse. A representative embodiment of the invention provides output pulses having a duration in the order of 20 microseconds in response to an input pulse of but 0.2 microsecond, a duration amplification of 100 while maintaining a substantially linear relationship between the output pulse amplitude and that of the input pulse.

It is an important object of the present invention to provide a pulse stretcher capable of providing pulse duration amplification.

It is another object of the invention to provide a pulse stretcher in accordance with the preceding object while maintaining a proportional relationship between the amplitudes of the output and input pulses.

It is still another object of the invention to provide a pulse stretcher in accordance with either of the preceding objects while providing an exceptionally high degree of pulse amplification.

It is still a further object of the invention to achieve the preceding objects with stable apparatus so arranged that the duration of the output pulse is virtually insensitive to those parameter values usually subject to variation.

According to the invention, means defining a delay furnishing wave transmission device has a first end coupled to an input terminal for receiving the input pulse and a second end terminated with means for reflecting energy of one polarity incident from the first end back toward the first end with reversed polarity. Means are provided for combining the incident pulse at the first end with the reflected pulse to provide the output pulse of longer duration than the input pulse.

Other features, objects and advantages of the invention will become apparent from the following specification when read in connection with the accompanying drawing, the single figure of which shows a schematic circuit diagram of a preferred embodiment of the invention with representative parameter values, this embodiment comprising two circuits according to the invention cascaded for stretching an input pulse of the order of 0.2 microsecond into an output pulse having a duration of the order of 20 microseconds.

With reference now to the drawing, a stretched output pulse is provided at terminal 12 in response to an input pulse of shorter duration applied at terminal 11, the amplitude of the output pulse on terminal 12 being proportional to the amplitude of the input pulse on terminal 11. The illustrated embodiment of the invention comprises two cascaded circuits according to the invention 13 and 14, respectively. Circuits 13 and 14 include differential amplifiers 15 and 16, respectively, comprising respective pairs of electron tubes V1, V2 and V3, V4. The grids of tubes V1 and V3 comprise a first input of differential amplifiers 15 and 16, respectively. A second input of each of these amplifiers comprises the grids of tubes V2 and V4, respectively. Circuits 13 and 14 have lumped parameter delay lines 21 and 22, respectively.

A first end of lumped parameter delay lines 21 and 22 is coupled by diodes D1 and D3, respectively to the grids of tubes V1 and V3, respectively, these diodes being poled to pass positive pulses and reject negative pulses. The first end of each delay line is coupled to the grid of tubes V2 and V4 by diodes D2 and D4, respectively, these diodes being poled to pass negative pulses and reject positive pulses. The second ends 25 and 26, respectively of delay lines 21 and 22 are short circuited so that positive pulses applied to ends 23 and 24, are reflected back to these ends following a delay interval. Ends 23 and 24 are coupled to input terminals 11 and 27, respectively, by means including single lumped parameter delay line sections 31 and 32, respectively. The functions of other illustrated elements will be better understood from the description of the mode of operation which follows.

Incoming pulses, preferably from a source like the 6AU6 tube and associated circuitry presenting an impedance substantially that of the characteristic impedance of the delay line, are applied to terminal 11 and then through a coupling capacitor and a lumped parameter section to the end 23 of delay line 21 short-circuited at its far end 25. An applied short pulse proceeds along the artificial delay line 21 toward the short-circuited end 25. There it is reflected back to the input end 23, but with polarity reversed. Input end 23 will therefore have a pair of oppositely polarized pulses whose leading edges are separated by twice the time T required for a pulse to travel from end 23 to end 25.

It is convenient to assume that the initial pulse applied at terminal 11 is positive and consequently the reflected delayed pulse is negative. The initial positive pulse at end 23 is passed by diode D1 to charge capacitor 33. Since diode D2 is poled to transmit negative pulses, this initial positive pulse does not change the potential across capacitor 34. Thus, this positive pulse increases the potential on the grid of tube V1 without affecting the potential on the grid of tube V2. This increase in grid potential produces an increase in the plate current drawn by tube V1 through the inductor 35 and the load resistance 36 common to tubes V1 and V2, the small value resistors 37 functioning to suppress parasitic oscillations. Capacitor 38 and resistor 39 function as a decoupling network. This current increase causes a drop in potential across coupling capacitor 41 connected to the point 27 functioning as the output of the first pulse stretcher circuit 13 and the input of the second pulse stretcher circuit 14. By choosing the time constant of the circuit comprising input capacitor 33 and grid resistor 42 to be long compared to the time interval between the initial positive pulse and the following negative pulse, the potential on capacitor 33 does not change appreciably during this interval between pulses. By choosing capacitor 33 to have a value sufficiently small so that its capacity, the conducting resistance of diode D1 and the effective reactance presented by delay line 21 establish a short charging time constant, capacitor 33 is charged to a potential proportional to the amplitude of the input pulse applied on terminal 11 in a time interval short compared to the separation between successive positive and negative pulses at this point.

With the above conditions met, the potential on terminal 27 remains substantially constant during the interval between successive positive and negative pulses at a value proportional to the amplitude of the input pulse applied to terminal 11. Now consider what happens when the reflected negative pulse arrives at end 23. This negative pulse has no effect on the potential on capacitor 33 because diode D1 will not pass it, but diode D2 is poled to pass this negative pulse and it charges capacitor 34 negatively in a time interval short compared to the time between the successive positive and negative pulses. This charging reduces the potential on the grid of tube V2 and reduces the current drawn by tube V2 through inductor 35 and load resistor 36, thereby returning the potential at point 27 to its value just before the occurrence of the positive pulse applied to terminal 11. The resistor 43 preferably coacts with capacitor 34 to establish a time constant of the order of that established by capacitor 33 and resistor 42 so that capacitors 33 and 34 discharge at substantially the same rate to respectively reduce and increase the potential on the grids of tubes V1 and V2 at the same rate so that the potential on point 27 does not change appreciably as capacitors 33 and 34 discharge. The discharge time constant of each of these circuits is preferably long compared to the total delays furnished by delay line 21 while being preferably shorter than the time interval between the application of successive pulses to terminal 11.

Tubes V1 and V2 are preferably like tubes biased at substantially the same quiescent operating point.

The circuit 14 operates in substantially the same manner as circuit 13. However, the delay furnished by delay line 22 is greater than that furnished by delay line 21 and the time constants of the RC circuits connected to the grids of tubes V3 and V4 may be increased because the durations of the pulses at junction 24 are longer than those at junction 23.

There are some other differences between circuit 14 and circuit 13 in a practical embodiment of the invention. Inexpensive inductors in delay line 22 introduce a certain amount of attenuation to pulse energy propagated along the delay line. Thus, the negative-going pulse delivered by the preceding stage is of larger amplitude than the positive-going pulse reflected from the short-circuited end 26 of delay line 22. The effects of this attenuation do not disturb the operation of the circuit because the RC circuit connected to the grid of tube V4 includes a smaller resistor than the RC circuit connected to the grid of tube V3. Thus, the incident pulse passed by diode D4 is attenuated somewhat more than the reflected pulse passed by diode D3 with the net result that the potential on the grid of tube V3 goes up by substantially the same amount that the potential on the grid of tube V4 went down. Diode D5 seems to reduce undesired effects caused by reflection of the reflected pulse from the input end of delay line 22.

A lumped parameter delay line of the type shown is a low pass filter. If the shortest pulse to be transmitted through such a delay line is T microseconds long, it is desirable that frequencies up to about $1/2T$ megacycles be below the cutoff frequency of the delay line. The actual cutoff frequency of the delay line which seemed to constitute a good compromise for use with pulses no shorter than $\frac{2}{10}$ of a microsecond was 2.87 megacycles. The total delay due to 2-way travel obtained with a delay line 21 consisting of 17 pi sections was 1.5 microseconds.

Similar principles were employed in the design of the second pulse stretcher in which a much lower cutoff frequency could be used because the pulses to be stretched were substantially longer. The cutoff frequency of the delay line 22 in the second pulse stretcher was .173 mc. The round trip delay time was 44 microseconds. The delay line consisted of 14 pi sections.

The stretched pulse is A.-C. coupled through capacitor 51 and applied to the primary 52 of a transformer 53 to provide a pulse with stretched duration and amplitude proportional to that of the input pulse applied to terminal 11. The output pulse at terminal 12 is then taken across the secondary of transformer 53, transformer 53 permitting delivery of an output pulse of either polarity at suitable impedance level for use by external apparatus.

There has been described a novel pulse stretching circuit capable of providing a pulse of selected duration whose stability is determined largely by the stability of the delay furnished by the delay lines. In addition, the invention establishes a proportional relationship between the amplitude of the stretched output pulse and that of the applied input pulse. Still another feature of the invention resides in its adaptability for cascading to provide virtually any duration expansion while maintaining proportionality between the amplitudes of the output and input pulses.

It is evident that those skilled in the art may now make numerous modifications of and departures from the specific embodiment described herein without departing from the inventive concepts. Consequently, the invention is to be construed as limited only by the spirit and scope of the appended claims.

What is claimed is:

1. An electrical circuit comprising, delay means responsive to an input pulse of one polarity for furnishing a delayed pulse of opposite polarity, combining means having an output and first and second inputs for providing an output signal related to the combination of signals applied to said first and second inputs, first polarity selective means for coupling said input pulse of only said one polarity to one of said first and second inputs, and second polarity selective means for coupling said delayed pulse of only said opposite polarity to the other of said first and second inputs, said combining means providing as said output signal a pulse of duration corresponding substantially to the time interval embraced by an input pulse of said one polarity and the immediately following delayed pulse of opposite polarity.

2. An electrical circuit in accordance with claim 1 wherein said delay means comprises a delay line having an input end and an output end said output end thereof terminated substantially in a short circuit for receiving an input pulse of said one polarity and reflecting said input pulse from said output end with polarity reversed.

3. An electrical circuit in accordance with claim 2 wherein said delay line has a characteristic impedance, and a source of said input pulses coupled to the input end of said delay line and terminating said delay line substantially in its characteristic impedance.

4. An electrical circuit in accordance with claim 2 wherein said combining means having an output and first and second inputs comprises, first means for storing a signal related to the amplitude of said input pulse on said one input, second means for storing a signal related to the amplitude of said reflected pulse on said other input whereby said output provides a signal pulse having an amplitude proportional to the amplitude of said input pulse and a duration determined by the delay furnished by said delay means.

5. An electrical circuit comprising, means defining a transmission line having an input end and an output end, means for terminating said output end substantially in a short circuit, first and second signal amplifying devices each having at least a control electrode and an output electrode, a load impedance, means for coupling said output electrodes to said load impedance to develop an output signal across said load impedance related to the signal on said control electrodes, first unilaterally conducting means for coupling pulses of one polarity from said transmission line to said first signal amplifying device control electrode, and second unilaterally conducting means for coupling said pulses to said second signal amplifying device control electrode after reflection from said output end with polarity reversed.

6. An electrical circuit in accordance with claim 5 and further comprising,
  a first RC network coupled to said first device control electrode,
  a second RC network coupled to said second device control electrode,
  the time constant of each of said networks being long compared to the delay furnished by said transmission line to a pulse travelling from said input end to said output end.

7. An electrical circuit in accordance with claim 6 wherein the parameters of said RC networks correspond to values resulting in substantially equal amplitude pulses being delivered to said control electrodes.

8. An electrical circuit in accordance with claim 5 and further comprising a pulse source coupled to said input end and terminating said transmission line substantially in the transmission line characteristic impedance.

9. An electrical circuit in accordance with claim 8 wherein said transmission line comprises a lumped parameter delay line comprising a number of cascaded sections,
  at least one of said cascaded sections located between said output end and both said unilaterally conducting means.

10. An electrical circuit in accordance with claim 9 wherein said pulse source provides pulses of duration shorter than the time between a pulse being passed by said first unilaterally conducting means and the same pulse being passed by said second unilaterally conducting means following reflection from said output end.

References Cited in the file of this patent

UNITED STATES PATENTS

| | | |
|---|---|---|
| 2,546,371 | Peterson | Mar. 27, 1951 |
| 2,794,123 | Younker | May 28, 1957 |
| 2,931,981 | Schabauer | Apr. 5, 1960 |
| 3,034,062 | Bleam | May 8, 1962 |